(12) United States Patent
Hewitt

(10) Patent No.: US 7,950,973 B2
(45) Date of Patent: May 31, 2011

(54) AMPHIBIOUS VEHICLE

(76) Inventor: Stanley C. Hewitt, Ketchikan, AK (US)

( * ) Notice: Subject to any disclaimer, the term of this patent is extended or adjusted under 35 U.S.C. 154(b) by 0 days.

(21) Appl. No.: 12/591,265

(22) Filed: Nov. 13, 2009

(65) Prior Publication Data

US 2010/0062664 A1 Mar. 11, 2010

Related U.S. Application Data

(63) Continuation-in-part of application No. 12/285,112, filed on Sep. 29, 2008, now abandoned, which is a continuation-in-part of application No. 12/000,847, filed on Dec. 18, 2007, now abandoned.

(51) Int. Cl.
*B63H 19/08* (2006.01)

(52) U.S. Cl. .................................. 440/12.52; 440/12.54

(58) Field of Classification Search ............... 440/12.52, 440/12.54
See application file for complete search history.

(56) References Cited

U.S. PATENT DOCUMENTS

| | | | |
|---|---|---|---|
| 1,490,964 A | 4/1924 | Cook et al. | |
| 3,095,938 A * | 7/1963 | Bertelsen | 180/119 |
| 3,306,250 A | 2/1967 | Pitchford | |
| 3,487,802 A | 1/1970 | Roy | |
| 3,941,074 A | 3/1976 | Millerbernd | |
| 4,176,726 A | 12/1979 | Schaeff | |
| 4,658,751 A | 4/1987 | Koot | |
| 4,761,017 A | 8/1988 | Claux | |
| 5,027,737 A * | 7/1991 | Duffty et al. | 440/12.54 |
| 5,181,478 A * | 1/1993 | Berardi | 440/12.54 |
| 6,267,196 B1 | 7/2001 | Wilcox et al. | |
| 6,921,304 B2 * | 7/2005 | Hewitt | 440/12.52 |
| 6,945,832 B2 | 9/2005 | Roycroft | |
| 6,971,931 B2 | 12/2005 | Davis | |
| 7,261,176 B2 | 8/2007 | Chun et al. | |
| 2003/0176119 A1 | 9/2003 | Royle | |
| 2004/0142609 A1 | 7/2004 | Davis | |
| 2006/0105644 A1 | 5/2006 | Bryham | |

* cited by examiner

*Primary Examiner* — Stephen Avila
(74) *Attorney, Agent, or Firm* — Richard C. Litman

(57) ABSTRACT

The amphibious vehicle is a motorized vehicle capable of travel on land as well as in the water. The amphibious vehicle has a boat-like hull and a caterpillar track assembly mounted along each side by a respective pair of rotating supports. The tracks are arranged so that the tracks can be rotated between a lowered position supporting the amphibious vehicle and providing traction and propulsion during land operation, and a raised position, where the tracks rest vertically above the hull's deck during marine operation. With the caterpillar track assemblies in the raised position, the caterpillar track assemblies are fully removed from the water to improve performance and maneuverability therein. The track assemblies are hydraulically driven to rotate the wheels and tracks between the lowered and raised positions.

10 Claims, 9 Drawing Sheets

AMPHIBIOUS VEHICLE

CROSS-REFERENCE TO RELATED APPLICATION

This is a continuation-in-part of my prior application Ser. No. 12/285,112, filed on Sep. 29, 2008 now abandoned, which is a continuation-in-part of my prior application Ser. No. 12/000,847, filed on Dec. 18, 2007, now abandoned.

BACKGROUND OF THE INVENTION

1. Field of the Invention

The present invention relates to vehicles for use over rough terrain, and more particularly to an amphibious vehicle that may be used in water or on land.

2. Description of the Related Art

Amphibious vehicles are known in the art, with such vehicles being capable of providing transportation either in water or on land. Such vehicles are useful in areas with many bodies of water, such as lakes, rivers, swamps, and the like, with the amphibious vehicle allowing the operator to travel across land and, upon reaching the edge of a body of water, proceed into the water and continue on.

Conventional amphibious vehicles have a driving assembly, typically an assembly of wheels or caterpillar tracks, which is fixed in position and cannot be retracted from the water during marine operation. The inability to remove the driving assembly from the water means that the amphibious vehicle cannot be operated at a high speed in the water because of the high drag caused by the submerged driving assembly. Maneuverability in the water is also compromised by the additional drag.

Thus, an amphibious vehicle solving the aforementioned problems is desired.

SUMMARY OF THE INVENTION

The amphibious vehicle is a motorized vehicle capable of travel on both land and in the water. The amphibious vehicle has a boat-like hull, and a caterpillar track assembly mounted along each side thereof. The amphibious vehicle is propelled by a conventional marine outdrive during marine operation, and by the motor-driven caterpillar track assemblies when operated on land.

The hull of the amphibious vehicle includes laterally opposed first and second sides, a bow, and a stern, with the hull extending between the bow and stern along a longitudinal axis. First and second front rotating supports are rotatably attached to the hull on either side thereof adjacent the bow. Similarly, first and second rear rotating supports are rotatably attached to the hull adjacent the stern thereof.

The first and second track drive assemblies each extend along the longitudinal axis, with the first track drive assembly being rotatably attached to the first front and first rear rotating supports at longitudinally opposed ends thereof, and the second track drive assembly being rotatably attached to the second front and second rear rotating supports at longitudinally opposed ends thereof. In operation, each of the first and second track drive assemblies is rotatable through a plane defined by the longitudinal axis and a vertical axis that is orthogonal to a lateral axis of the hull, with each of the first and second track drive assemblies being selectively rotatable between a downward position and an upright position. A hydraulic system for selectively driving rotation of the first and second track drive assemblies between the downward and upright positions is further provided.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
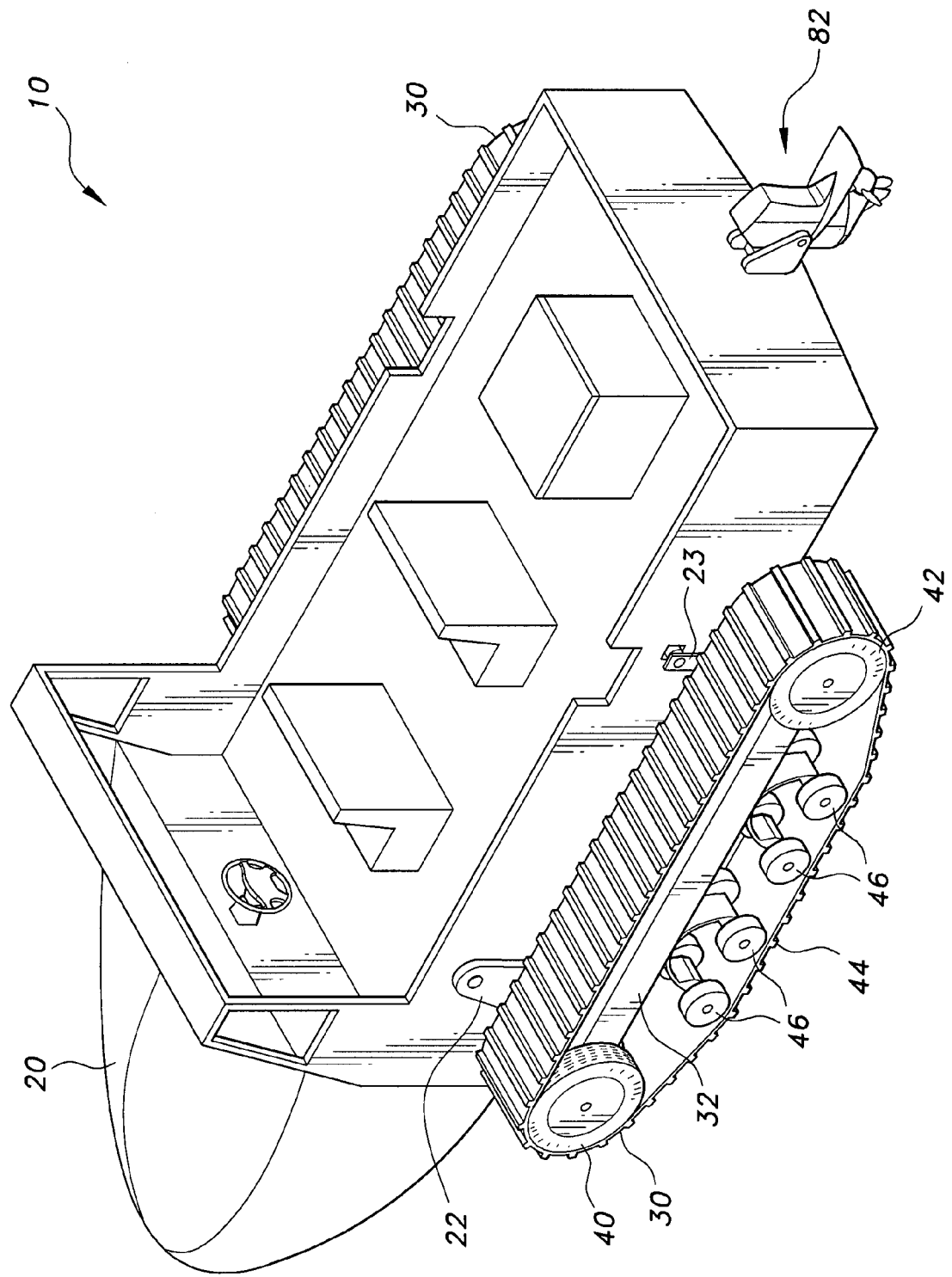
FIG. 1 is a perspective view of an amphibious vehicle according to the present invention.
Figure 2:
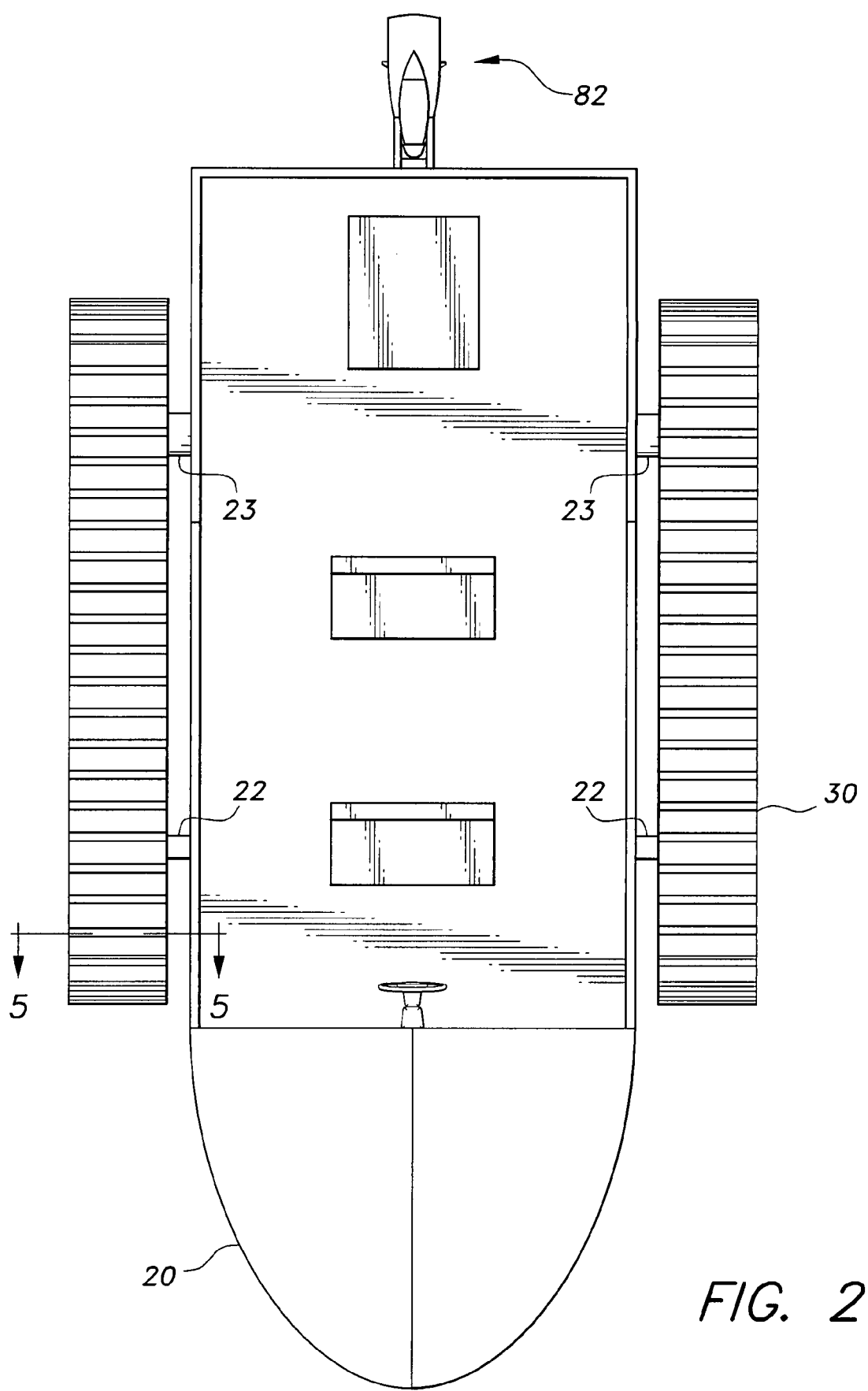
FIG. 2 is a top view of the amphibious vehicle according to the present invention.
Figure 3:
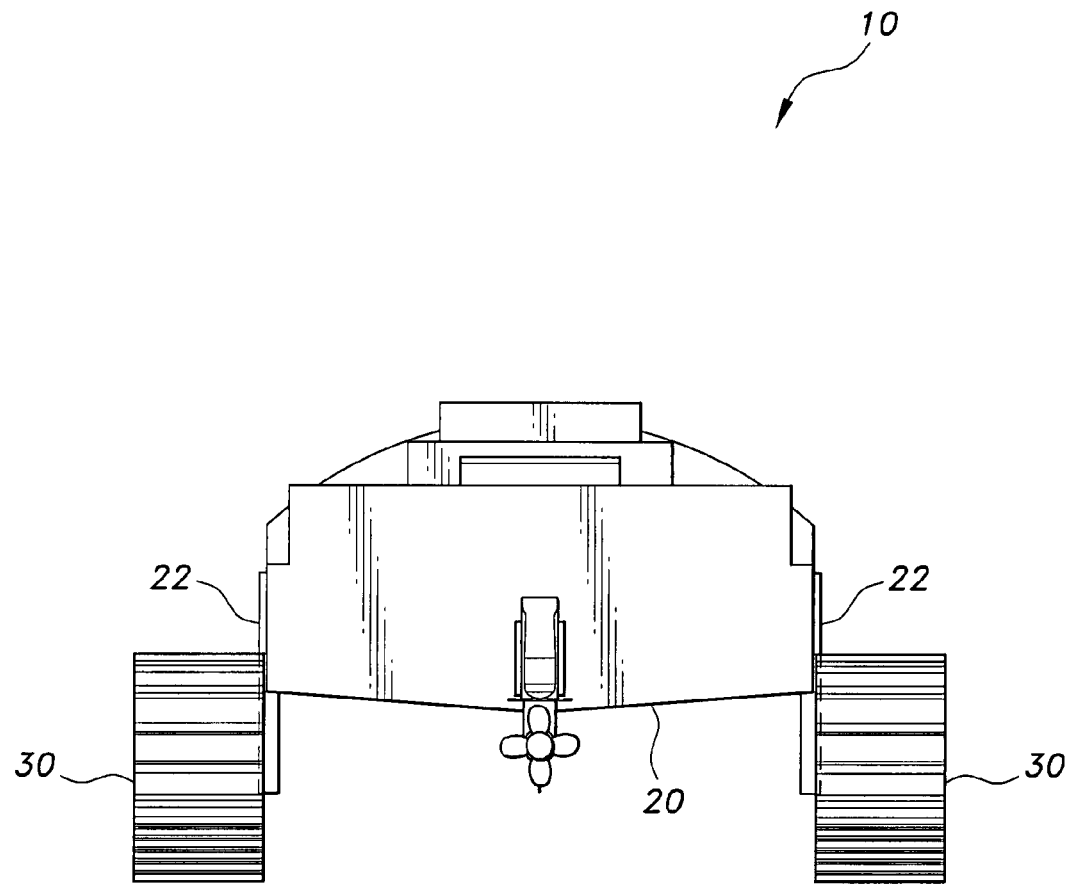
FIG. 3 is a rear view of the amphibious vehicle according to the present invention, with track drive assemblies thereof shown in a lowered configuration.

As shown in FIGS. 1-4, the amphibious vehicle 10 is a motorized vehicle capable of travel on both land and in the water. The amphibious vehicle 10 has a boat-like hull 20, and a caterpillar track assembly 30 mounted along each side thereof. The amphibious vehicle 10 is propelled by a conventional marine outdrive 82 during marine operation, and by the motor-driven caterpillar track assemblies 30 while operated on land. It should be understood that the particular dimensions and configuration, as well as auxiliary external features, such as the passenger cabin, are shown for exemplary purposes only in the drawings, and may be customized or otherwise altered without departing from the spirit or scope of the present invention.

The hull 20 of the amphibious vehicle 10 includes laterally opposed first and second sides, a bow, and a stern, with the hull extending between the bow and stern along a longitudinal axis. First and second front rotating supports 22 are rotatably attached to the hull 20 on either side thereof adjacent the bow. Similarly, first and second rear rotating supports 23 are each rotatably attached to the hull adjacent the stern thereof.

The first and second track drive assemblies 30 each extend along the longitudinal axis, with the first track drive assembly being rotatably attached to the first front and first rear rotating supports 22, 23 at longitudinally opposed ends thereof, and the second track drive assembly being rotatably attached to the second front and second rear rotating supports 22, 23 at longitudinally opposed ends thereof. The first and second track drive assemblies 30 are symmetric about the longitudinal axis of hull 20.

Figure 4:
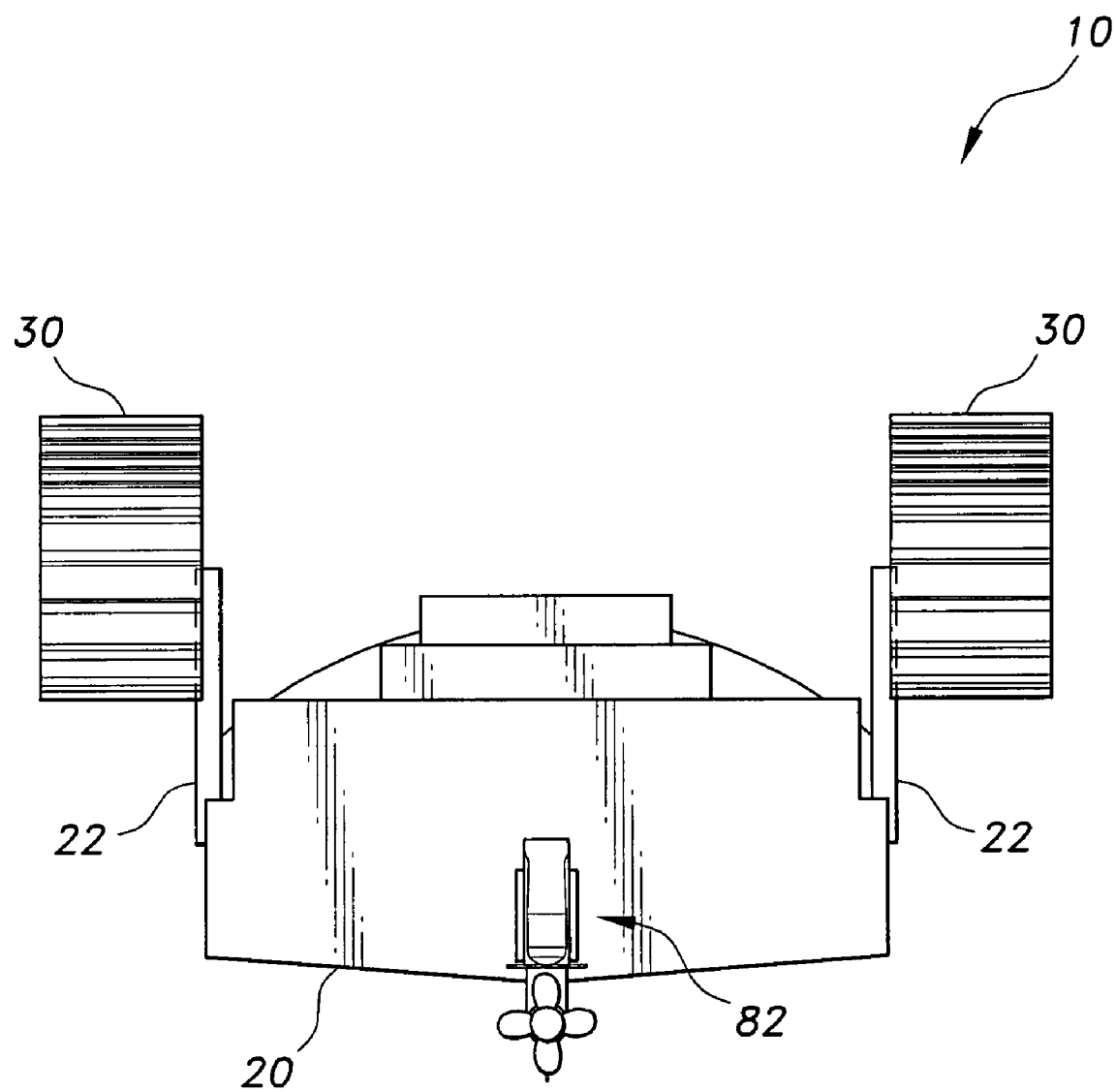
FIG. 4 is a rear view of the amphibious vehicle according to the present invention, with the track drive assemblies shown in a raised configuration.
Figure 7:
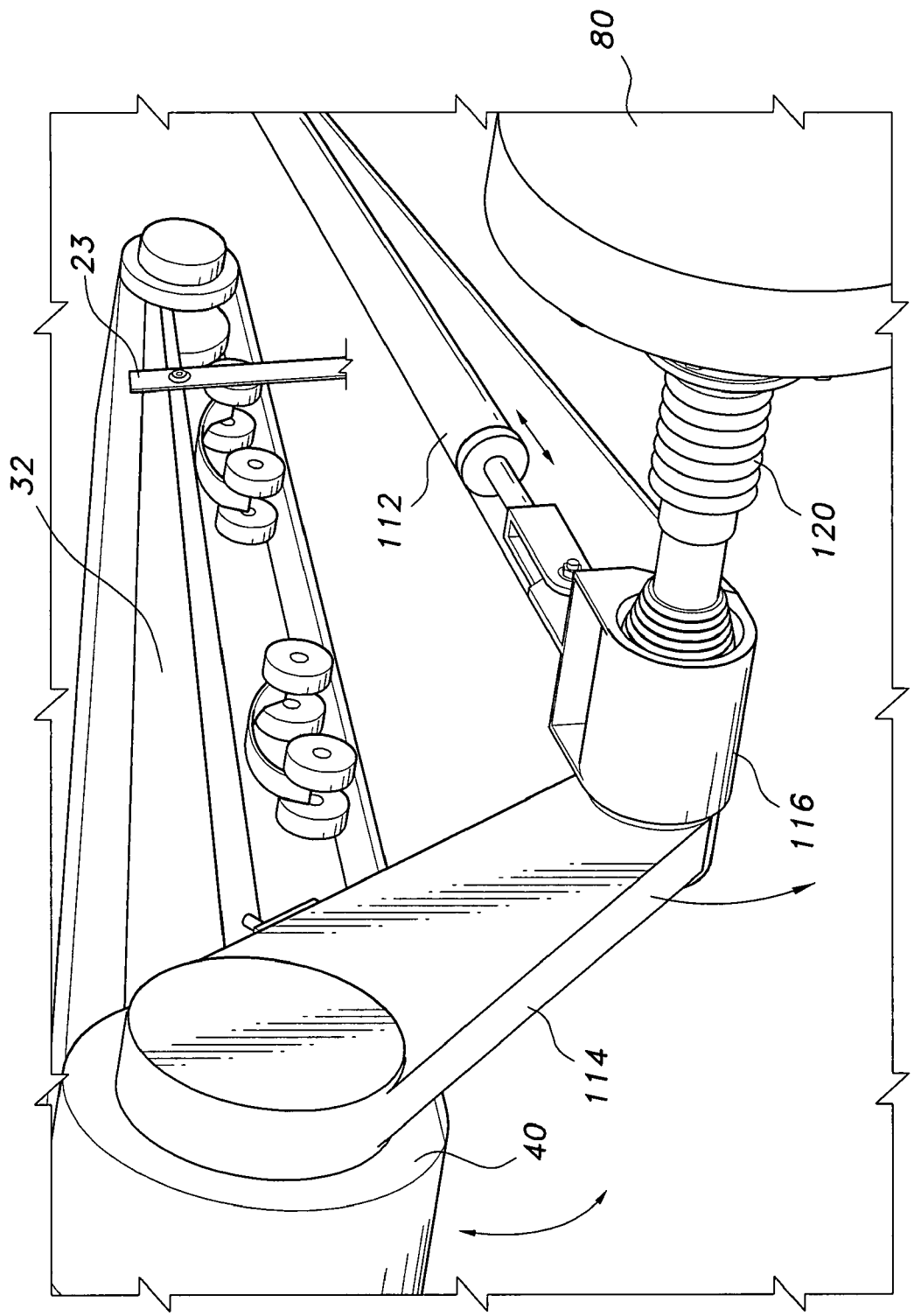
FIG. 7 is a partial perspective view of the front drive system of the amphibious vehicle according to the present invention, showing one track drive assembly in the raised position, the hull being omitted.
Figure 8:
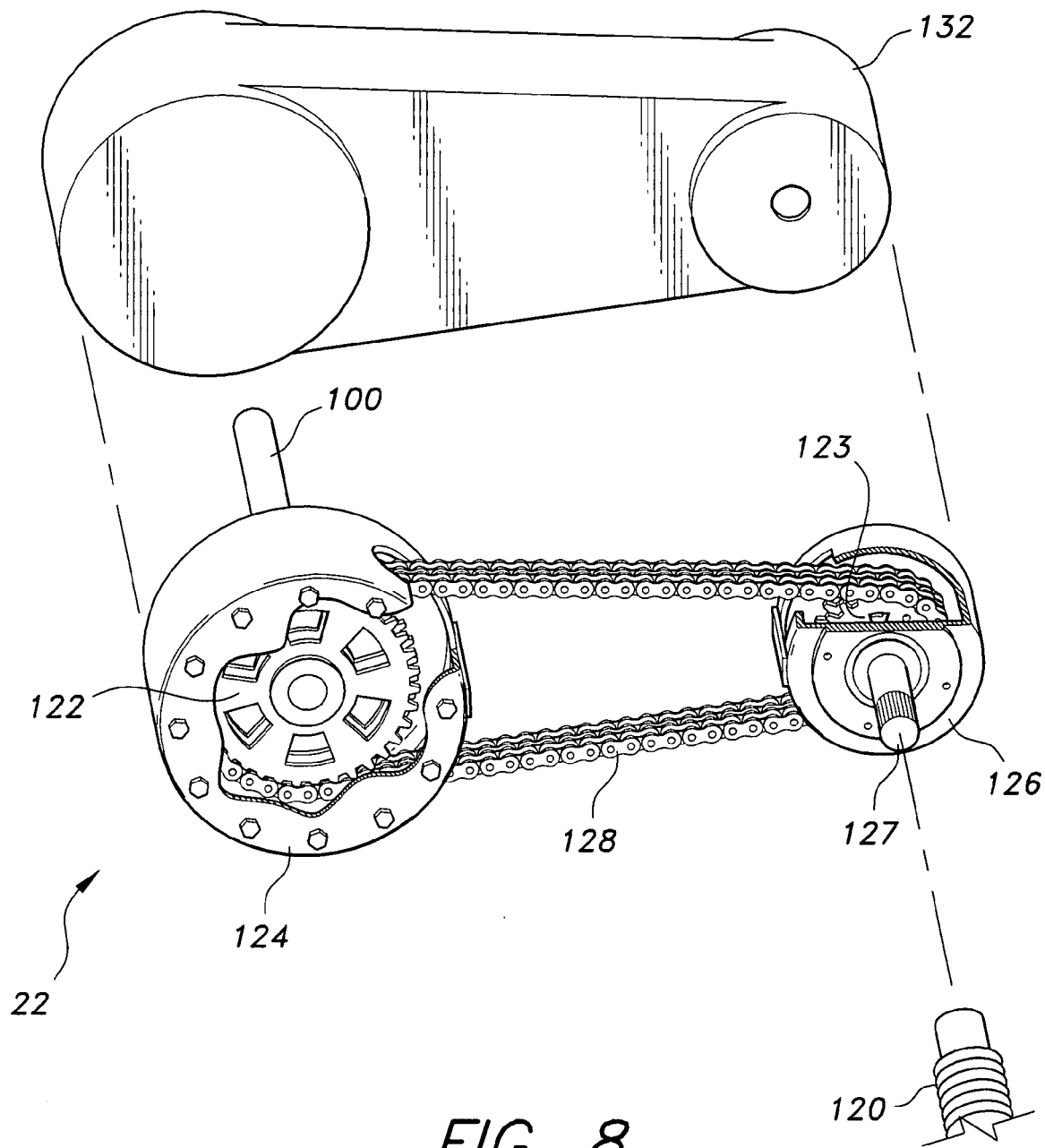
FIG. 8 is an exploded view of a front rotating support of the amphibious vehicle according to the present invention, broken away and partially in section to show details thereof.

In operation, each of the first and second track drive assemblies 30 is rotatable through a plane defined by the longitudinal axis and a vertical axis, which is orthogonal to a lateral axis of the hull 20, with each of the first and second track drive assemblies 30 being selectively rotatable between a downward position (shown in FIG. 3) and an upright position (shown in FIG. 4). A hydraulic system for selectively driving rotation of the first and second track drive assemblies between the downward and upright positions is further provided. With the track assemblies 30 clear of the waterline (in the upright position of FIG. 4) during marine operation, track assemblies 30 present no drag to hinder marine performance. The track assemblies 30 provide propulsion for land operation, while marine outdrive 82 propels the amphibious vehicle 10 during marine operation. As shown in FIGS. 7 and 8, shafts 120 not only provide drive power for the track assemblies 30, but are selectively collapsible for shifting the track assemblies 30 in the horizontal direction.

Each of the first and second rear rotating supports 23 and each of the first and second front rotating supports 22 has an interior portion and an exterior portion, with the interior portions thereof being positioned within the hull 20, and the exterior portions thereof being positioned outside of the hull. The first and second track drive assemblies 30 are attached to the exterior portions thereof. As will be described in greater detail below, the front rotating supports 22 transmit drive power to the wheels and track of the amphibious vehicle 10, in addition to raising and lowering the track assemblies 30. Thus, the front rotating supports 22 have a mechanical interior structure, which will be described in detail below. However, the rear supports 23 are provided only for the raising and lowering of the track assemblies 30, with the exterior portions thereof being formed as unitary or integral structures, which may be solid bars, support beams or the like, as shown. The interior portions of rear supports 23 are similar to those of the front rotating supports 22, to be described in detail below.

Figure 6:
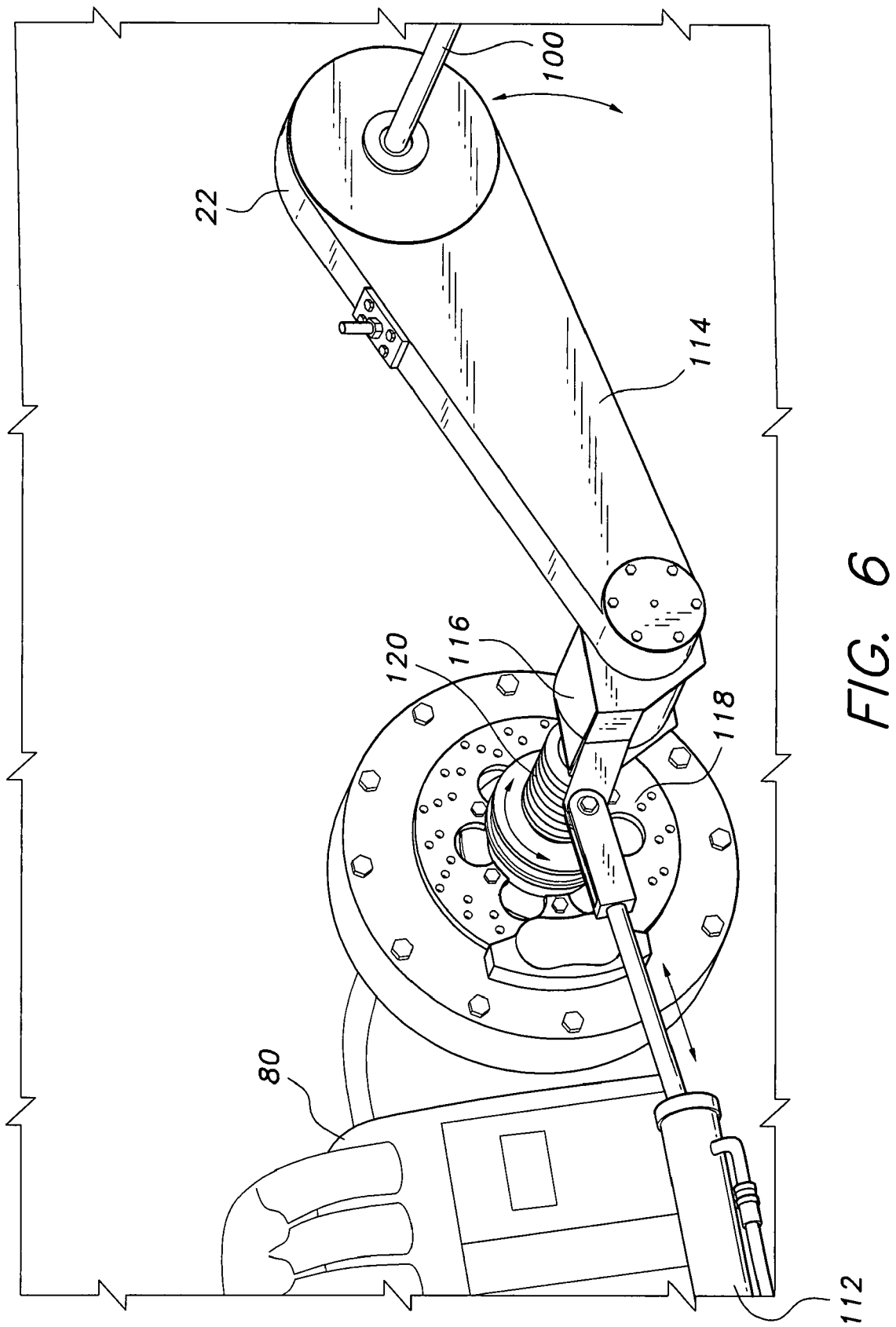
FIG. 6 is a partial perspective view of the front drive system of the amphibious vehicle according to the present invention, the hull being omitted.

As shown in FIGS. 6 and 7, the hydraulic system for selectively driving rotation of the first and second track drive assemblies 30 between the downward and upright positions includes first and second front hydraulic cylinders 112 mounted within the hull 20 (best shown in FIGS. 6 and 7), with each of the first and second front hydraulic cylinders 112 having a cylinder and a piston extendable therefrom. Each piston is pivotally joined to a bearing case 116 at pivot joint 118, which may be a bolt joining a clevis at the end of the piston to a crank extending from the bearing case 116. In FIGS. 6 and 7, only one such set of front rotating supports 22 and the corresponding hydraulic cylinder 112 is shown, although it should be understood that the laterally opposed set is identical in structure and function to that shown. Bearing case 116 is also disposed within the hull 20. The rear end or base of the hydraulic cylinder 112 is mounted to a fixed support by a pivot pin that allows the cylinder to rock upward slightly when the pivot joint 118 causes the crank and entire piston case 116 to rotate.

Similarly, first and second rear hydraulic cylinders, which are identical in structure and function to those described above with respect to front hydraulic cylinders 112, are mounted within the hull 20, with each of the first and second rear hydraulic cylinders having opposed a cylinder and piston extendable therefrom. Each piston is pivotally joined to a respective one of the interior portions of the first and second rear rotating supports 23. As noted above, the exterior portions of the rear rotating supports 23 are solid, unitary support structures, although the interior portions thereof are rotating supports similar to the rotating interior portions 116 of the front rotating supports 22; i.e., the internal structure of the rear supports 23 and their hydraulic drive system is similar to that shown in FIGS. 6 and 7 for the front rotating supports 22, including identical hydraulic cylinders 112, pivotal connections 118, etc.

As shown in FIG. 1, each of the first and second track drive assemblies 30 includes a frame that defines opposed first and second ends. A front wheel 40 is rotatably mounted on the first end of the frame, and an idler, or rear wheel, 42 is rotatably mounted on the second end of the frame. Further, a plurality of road wheels 46 are rotatably mounted to the frame, with the plurality of road wheels 46 being disposed inline between the front wheel 40 and the idler 42, as shown. An endless belt track member 44 is entrained about the front wheel 40, the idler 42, and the plurality of road wheels 46. Although shown in FIG. 1 as having four such road wheels 46, it should be understood that this is for exemplary purposes only, and any suitable number of wheels 46 may be utilized. Each of the road wheels 46 may form a single wheel, or a tandem or multi-wheel assembly. The track assembly 30 may also include a plurality of guide wheels (not shown) disposed between the forward wheel 40 and the rearward wheel 42 above the road wheels 46.

Figure 5:
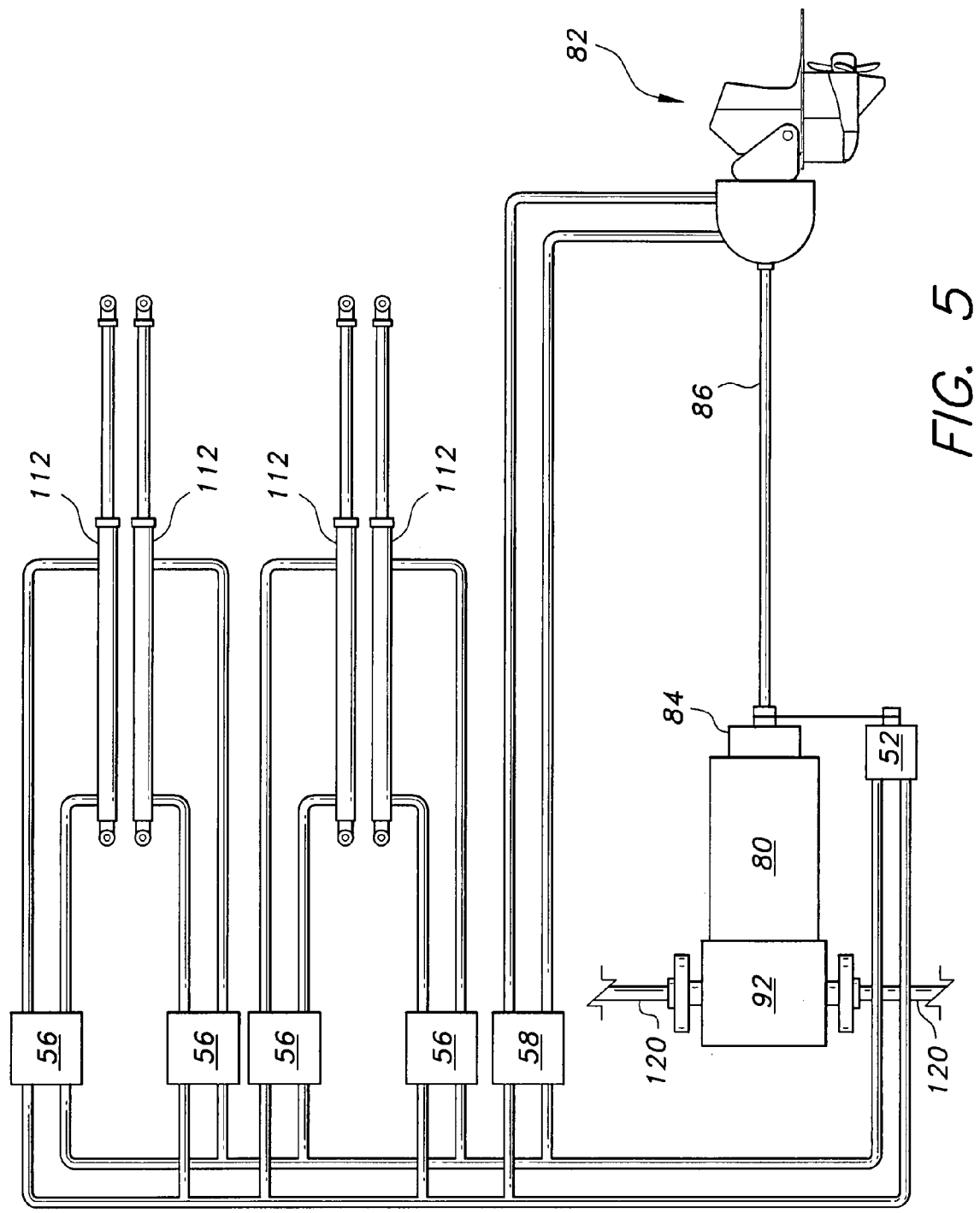
FIG. 5 is a schematic diagram of the power and hydraulic system of the amphibious vehicle according to the present invention.

Further, a marine outdrive 82 is disposed on the stern of the hull 20 for driving the vehicle 10 when the vehicle is in water. An internal combustion engine 80 is disposed within the hull 20, with the internal combustion engine 80 being coupled to the marine outdrive 82, as shown in FIG. 5. The engine 80 drives the marine outdrive 82 through a marine clutch 84 and a drive shaft 86. The marine clutch 84 is disposed between the engine 80 and the marine outdrive 82 so that the outdrive 82 can be disengaged from the engine 80 during land operation and engaged for marine operation.

A hydraulic system powers the selective raising and lowering of track assemblies 30. The hydraulic system includes at least one hydraulic pump 52. The hydraulic pump 52 is used for the operation of the hydraulic cylinders 112, and may also operate a lifting mechanism for the outdrive propeller, a winch, and additional auxiliary equipment. Hydraulic pump 52 is belt driven by engine 80. Cylinder control valves 56 control the flow of hydraulic fluid to the hydraulic cylinders 112, and allow the hydraulic cylinders 112 to be operated to raise and lower the track assemblies 30. Additionally, an outdrive tilt control valve 58 may be provided to control the flow of hydraulic fluid to the outdrive 82 to raise and lower the outdrive propeller. Further, as is best shown and described below with regard to FIGS. 7 and 8, engine 80 drives first and second engine shafts 120, which, in turn, rotate drive shafts 100 through a chain and sprocket drive mechanism described below. The engine 80 includes a gearbox or differential 92 that transfers the rotational motion of the main drive shaft into orthogonal driving rotation of the first and second engine shafts 120 via differential gearing contained therein. As shown in FIGS. 6 and 7, the bearing case 116 is rotatably mounted about the engine shaft 120. Thus, actuation of one hydraulic cylinder 112 causes the bearing case 116 to rotate about shaft 120 (with the cylinder 112 being pivotally joined to bearing case 116 at 118). Shaft 120 extends through the bearing case 116 is connected to drive sprocket 123, shown in FIG. 8.

As shown in FIG. 7, first and second engine shafts 120 are coupled to the internal combustion engine 80, with each being rotatably driven thereby and projecting laterally from either lateral end thereof. First and second drive shafts 100 are each respectively secured to the first and second front wheels 40 for driving rotation thereof. The first and second engine shafts 120 are coupled with the first and second drive shafts 100 so that rotation of the first and second engine shafts 120, driven by the internal combustion engine 80, drives rotation of the first and second front wheels 40 (connected to shafts 100). A bearing is positioned within bearing case 116. Bearing case 116 rotates with respect to drive shaft 120, and chain cover 132 is fixed to bearing case 116, thus allowing for the raising and lowering of the tracks as bearing case 116 pivots about pivot 118 under hydraulic power from cylinder 112.

As shown in FIG. 8, the exterior portions 114 of each of the first and second front rotating supports 22 includes a chain cover 132 having opposed primary and secondary ends. A drive sprocket 123 is rotatably mounted within the housing 132 adjacent the primary end thereof, with the drive sprocket 123 being coupled to a shaft 127, which is, in turn, coupled to a respective one of the first and second engine shafts 120. As shown, shaft 127 preferably has a splined outer surface for mating with an internally splined end of shaft 120, which permits moving the track assemblies inward to narrow vehicle 10, if needed, for transport over public highways. A driven sprocket 122 is similarly rotatably mounted within the chain cover 132 adjacent the secondary end thereof, with the driven sprocket 122 being coupled to a respective one of the first and second drive shafts 100. A drive chain 128 is mounted on the sprockets 123, 122, so that rotation of the drive sprocket 123 drives rotation of the driven sprocket 122.

Further, as shown, the exterior portions 114 of the first and second front rotating supports 22 each include a primary sprocket housing 126 and a secondary sprocket housing 124, each being received within the chain cover 132. The drive sprocket 123 is rotatably mounted within the primary sprocket housing 126 and the driven sprocket 122 is rotatably mounted within the secondary sprocket housing 124.

Figure 9:
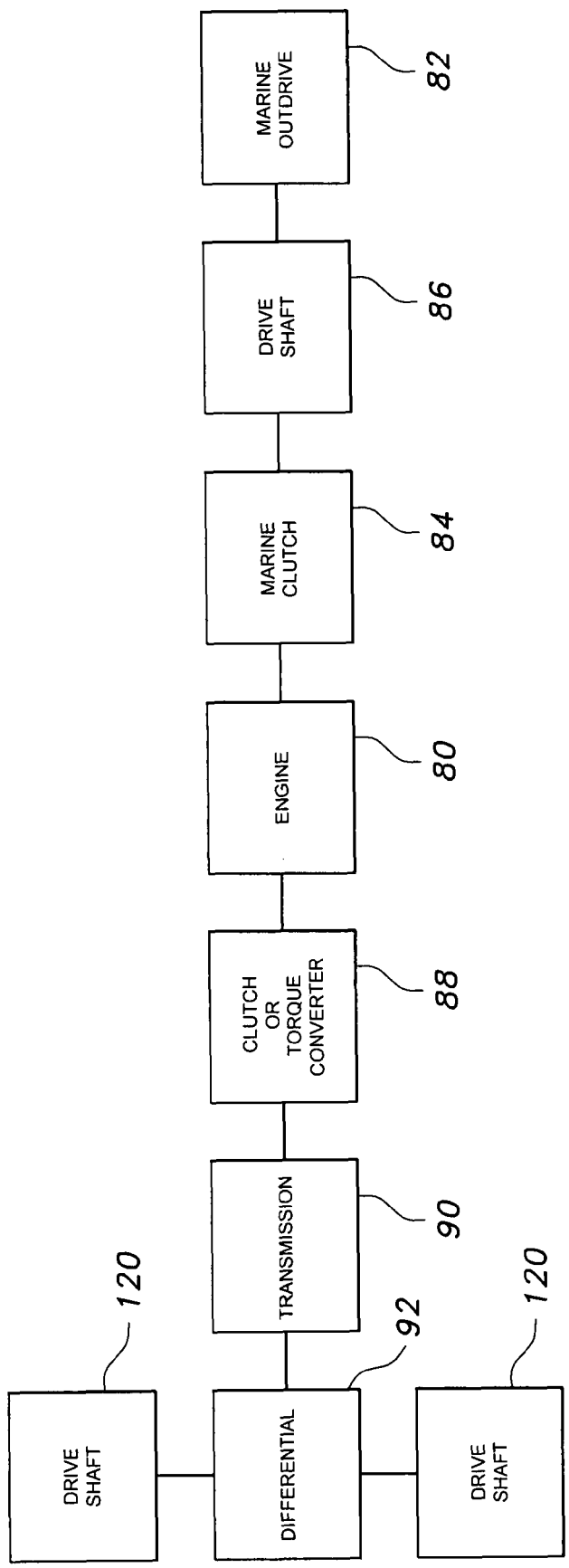
FIG. 9 is a block diagram of the drive system of the amphibious vehicle according to the present invention.

FIG. 9 summarizes the drive system for powering the amphibious vehicle 10. As shown, the engine 80 provides the motive power to drive both the outdrive 82 for marine travel and the drive shafts 120 for land travel. For traversing water, the marine clutch 84 selectively engages the drive shaft 86 to drive the outdrive 82. For traversing land, the marine clutch 84 is disengaged from the drive shaft 86 to discontinue operation of the outdrive 82 and allow inoperative tilt positioning of the same via the outdrive tilt control valve 58. The rotational power of the inherent main drive shaft inside the engine 80 is transferred through a clutch or torque converter 88 and transmission 90 to the differential 92. In turn, the bevel or similar transpositional gearing within the differential 92 transfers the rotational power from the engine 80 to the transaxle disposed drive shafts 120 to thereby drive the first and second track drive assemblies 30. Such drive assemblies for translating rotational motion of an engine crankshaft into rotational motion of a laterally extending transaxle or drive shafts 120 are conventional and well known to those of ordinary skill in the art of internal combustion engine vehicles and need not be described in greater detail.

It is to be understood that the present invention is not limited to the embodiments described above, but encompasses any and all embodiments within the scope of the following claims.

I claim:

1. An amphibious vehicle, comprising:
a hull having laterally opposed first and second sides, a bow, and a stern, the hull extending between the bow and stern, defining a longitudinal axis;
first and second front rotating supports, each of the front supports being rotatably attached to the hull adjacent the bow, each of the front supports being attached to a respective one of the laterally opposed first and second sides of the hull;
first and second rear rotating supports, each of the rear supports being rotatably attached to the hull adjacent the stern, each of the rear supports being attached to a respective one of the laterally opposed first and second sides of the hull;
first and second track drive assemblies, each of the track drive assemblies extending along the longitudinal axis, the first track drive assembly being rotatably attached to the first front and first rear rotating supports at longitudinally opposed ends of the track drive assembly, the second track drive assembly being rotatably attached to the second front and second rear rotating supports at longitudinally opposed ends of the track drive assembly, each of the first and second track drive assemblies being selectively rotatable between a downward position and an upright position, wherein each of said first and second track drive assemblies comprises:
a frame having opposed first and second ends;
a front wheel rotatably mounted to the first end of the frame;
an idler rotatably mounted to the second end of the frame;
a plurality of road wheels rotatably mounted to the frame, the plurality of road wheels being disposed in line between the front wheel and the idler; and
an endless belt track member entrained about the front wheel, the idler, and the plurality of road wheels;
each of said first and second rear rotating supports and each of said first and second front rotating supports having an interior portion and an exterior portion, the interior portions thereof being positioned within said hull, the exterior portions thereof being positioned outside of the hull, said first and second track drive assemblies being attached to the exterior portions of said front supports and said rear supports; and
means for selectively driving rotation of the first and second track drive assemblies between the downward and upright positions, wherein said means for selectively driving rotation of said first and second track drive assemblies comprises first and second front hydraulic cylinders mounted within said hull, each of said first and second front hydraulic cylinders having a cylinder and a piston extendable therefrom, each of the pistons being pivotally joined to a respective one of the interior portions of said first and second front rotating supports, and wherein said means for selectively driving rotation of said first and second track drive assemblies further comprises first and second rear hydraulic cylinders mounted within said hull, each of said first and second rear hydraulic cylinders having a cylinder and a piston extendable therefrom, each of the pistons being pivotally joined to a respective one of the interior portions of said first and second rear rotating supports.

2. The amphibious vehicle as recited in claim 1, further comprising:
a marine outdrive disposed on the stern of said hull;
an internal combustion engine disposed within said hull, the internal combustion engine being coupled to the marine outdrive; and
at least one hydraulic pump driven by the internal combustion engine, the at least one hydraulic pump being coupled to the first and second rear hydraulic cylinders and the first and second front hydraulic cylinders.

3. The amphibious vehicle as recited in claim 2, further comprising:

first and second engine shafts coupled to the internal combustion engine, each of the engine shafts being rotatably driven by the engine;

first and second drive shafts, each of the drive shafts being respectively secured to one of the first and second front wheels; and means for coupling the first and second engine shafts with the first and second drive shafts, respectively, so that rotation of the first and second engine shafts drives rotation of the first and second front wheels.

4. The amphibious vehicle as recited in claim 3, wherein each of said first and second front rotating supports has:

a chain cover having opposed primary and secondary ends;

a drive sprocket rotatably mounted within the chain cover adjacent the primary end, the drive sprocket being coupled to a respective one of the first and second engine shafts;

a driven sprocket rotatably mounted within the chain cover adjacent the secondary end, the driven sprocket being coupled to a respective one of the first and second drive shafts; and a drive chain mounted on the sprockets.

5. The amphibious vehicle as recited in claim 4, wherein each of said first and second front rotating supports further comprises a drive sprocket housing and a driven sprocket housing, each of the front supports being disposed within the crank cover, the drive sprocket being rotatably mounted within the drive sprocket housing and the driven sprocket being rotatably mounted within the driven sprocket housing.

6. An amphibious vehicle, comprising:

a hull having laterally opposed first and second sides, a bow, and a stern, the hull extending between the bow and stern, defining a longitudinal axis;

first and second front rotating supports, each of the front supports being rotatably attached to the hull adjacent the bow, the first and second front rotating supports being attached to a respective one of the laterally opposed first and second sides of the hull;

first and second rear rotating supports, each of the rear supports being rotatably attached to the hull adjacent the stern thereof, each of the first and second rear rotating supports being attached to a respective one of the laterally opposed first and second sides of the hull;

each of said first and second rear rotating supports and each of said first and second front rotating supports further including an interior portion and an exterior portion, the interior portions being disposed within said hull, the exterior portions being disposed outside of the hull, said first and second track drive assemblies being attached to the exterior portions of said front and rear supports;

first and second track drive assemblies, each of the track drive assemblies extending along the longitudinal axis, the first track drive assembly being rotatably attached to the first front and first rear rotating supports at longitudinally opposed ends of the drive assembly, the second track drive assembly being rotatably attached to the second front and second rear rotating supports at longitudinally opposed ends of the drive assembly, each of the first and second track drive assemblies being selectively rotatable between a downward position and an upright position, wherein each of said first and second track drive assemblies comprises:

a frame having opposed first and second ends;

a front wheel rotatably mounted to the first end of the frame;

an idler rotatably mounted to the second end of the frame;

a plurality of road wheels rotatably mounted to the frame, the plurality of road wheels being disposed in line between the front wheel and the idler; and an endless belt track member entrained about the front wheel, the idler, and the plurality of road wheels;

first and second front hydraulic cylinders mounted within the hull, each of the first and second front hydraulic cylinders having opposed fixed and movable ends, each of the movable ends being pivotally joined to a respective interior portion of the first and second front rotating supports; and first and second rear hydraulic cylinders mounted within said hull, each of said first and second rear hydraulic cylinders having a cylinder and a piston extendable from the cylinder, each of the pistons being pivotally joined to a respective one of the interior portions of said first and second rear rotating supports.

7. The amphibious vehicle as recited in claim 6, further comprising:

a marine outdrive disposed on the stern of said hull;

an internal combustion engine disposed within said hull, the internal combustion engine being coupled to the marine outdrive; and at least one hydraulic pump driven by the engine, the at least one hydraulic pump being coupled to the first and second rear hydraulic cylinders and the first and second front hydraulic cylinders.

8. The amphibious vehicle as recited in claim 7, further comprising:

first and second engine shafts coupled to the internal combustion engine, each of the engine shafts being rotatably driven by the engine;

first and second drive shafts, each of the drive shafts being coupled to one of the first and second front wheels, respectively; and means for coupling the first and second engine shafts with the first and second drive shafts, respectively, so that rotation of the first and second engine shafts drives rotation of the first and second front wheels.

9. The amphibious vehicle as recited in claim 8, wherein each of said first and second front rotating supports has:

a chain cover having opposed primary and secondary ends;

a drive sprocket rotatably mounted within the chain cover adjacent the primary end, the drive sprocket being coupled to a respective one of the first and second engine shafts;

a driven sprocket rotatably mounted within the housing adjacent the secondary end, the driven sprocket being coupled to a respective one of the first and second drive shafts; and a drive chain mounted on the sprockets.

10. The amphibious vehicle as recited in claim 9, wherein each of said first and second front rotating supports further comprises a drive sprocket housing and a driven sprocket housing, each of the front supports being disposed within the chain cover, the drive sprocket being rotatably mounted within the drive sprocket housing and the driven sprocket being rotatably mounted within the driven sprocket housing.

* * * * *